United States Patent
Zhang et al.

(10) Patent No.: US 11,962,155 B2
(45) Date of Patent: Apr. 16, 2024

(54) PHOTOVOLTAIC POWER GENERATION SYSTEM

(71) Applicant: Hangzhou Binary Optoelectronics & Tech Co., Ltd., Zhejiang (CN)

(72) Inventors: Gaole Zhang, Zhejiang (CN); Zhixuan Zhang, Zhejiang (CN)

(73) Assignee: HANGZHOU BINARY OPTOELECTRONICS & TECH CO., LTD., Zhejiang (CN)

(*) Notice: Subject to any disclaimer, the term of this patent is extended or adjusted under 35 U.S.C. 154(b) by 436 days.

(21) Appl. No.: 17/297,105

(22) PCT Filed: Feb. 3, 2021

(86) PCT No.: PCT/CN2021/075119
§ 371 (c)(1),
(2) Date: May 26, 2021

(87) PCT Pub. No.: WO2022/033002
PCT Pub. Date: Feb. 17, 2022

(65) Prior Publication Data
US 2022/0052529 A1    Feb. 17, 2022

(30) Foreign Application Priority Data

Aug. 12, 2020 (CN) .......................... 202010810060.5

(51) Int. Cl.
*H02J 3/38* (2006.01)
*H02S 40/38* (2014.01)
*H02S 50/10* (2014.01)

(52) U.S. Cl.
CPC .............. *H02J 3/381* (2013.01); *H02S 40/38* (2014.12); *H02S 50/10* (2014.12); *H02J 2300/24* (2020.01)

(58) Field of Classification Search
CPC ....... H02J 3/381; H02J 2300/24; H02S 40/38; H02S 50/10
See application file for complete search history.

(56) References Cited

FOREIGN PATENT DOCUMENTS

| CN | 102217426 A | 10/2011 |
|---|---|---|
| CN | 203868913 U | 10/2014 |

(Continued)

OTHER PUBLICATIONS

Cui et al., CN 104991601 A, English Machine Translation. (Year: 2015).*

(Continued)

*Primary Examiner* — Tae-Sik Kang
(74) *Attorney, Agent, or Firm* — IP & T GROUP LLP (57) ABSTRACT

The present disclosure provides a photovoltaic power generation system, relating to the technical field of new energy resources, including at least two photovoltaic power generation devices; each photovoltaic power generation device includes: a photovoltaic panel unit, which is configured to generate light-sensitive electrical energy based on photovoltaic effect; an energy storage unit, which is connected to an output end of the photovoltaic panel unit, and is configured to store the light-sensitive electrical energy; an input unit, of which one end is connected to the energy storage unit, and the other end is connected to the output end of the photovoltaic panel unit of the other photovoltaic power generation device; and an output unit, of which one end is connected to the output end of the photovoltaic panel unit, and the other end is connected to the energy storage unit of the other photovoltaic power generation device.

20 Claims, 5 Drawing Sheets (56) References Cited

FOREIGN PATENT DOCUMENTS

| CN | 104991601 | A | * | 10/2015 |
| CN | 104991601 | A | | 10/2015 |
| CN | 107990238 | A | | 5/2018 |
| CN | 111817423 | A | | 10/2020 |

OTHER PUBLICATIONS

International Search Report for PCT application No. PCT/CN2021/075119 dated Apr. 30, 2021.

* cited by examiner

PHOTOVOLTAIC POWER GENERATION SYSTEM

CROSS REFERENCE TO RELATED APPLICATION

This application is a national stage application of PCT/CN2021/075119 filed on Feb. 3, 2021, which claims the priority to the Chinese patent application filed with the Chinese Patent Office on Aug. 12, 2020, with the filing No. 202010810060.5, and entitled "Photovoltaic Power Generation System", the contents of which are incorporated herein by reference in entirety.

TECHNICAL FIELD

The present disclosure relates to the technical field of new energy resources, and in particular to a photovoltaic power generation system.

BACKGROUND ART

With global warming, and deterioration of ecological environment, various countries take energy saving and environmental protection as an important state policy, and in terms of clean energy, solar energy is widely used.

The conventional large-power solar power generation, characterized by large investment in early stage and slow cost recovery, is generally used by large enterprises or specialized companies, and cannot be afforded by individual families. The small solar panels suitable for individual families are widely used in courtyard lighting, but the small solar panels have low power and primitive structure, and the solar panels are generally directly connected to a load to supply power, then in the case where the sunshine duration is insufficient, light angles in different time periods are different or the battery life has different influences, the power supply effect of the solar panels is unstable, and the stable power supply cannot be performed for the load.

SUMMARY

One of the objectives of the embodiments of the present disclosure includes providing a photovoltaic power generation system for addressing the problem of unstable power supply in the prior art.

In order to achieve the above objective, a technical solution adopted in an embodiment of the present disclosure is as follows: an embodiment of the present disclosure provides a photovoltaic power generation system, including at least two photovoltaic power generation devices; each of the photovoltaic power generation devices includes: a photovoltaic panel unit, which is configured to generate light-sensitive electrical energy based on photovoltaic effect; an energy storage unit, which is connected to an output end of the photovoltaic panel unit, and is configured to store the light-sensitive electrical energy; an input unit, of which one end is connected to the energy storage unit, and the other end is connected to the output end of the photovoltaic panel unit of the other photovoltaic power generation device; and an output unit, of which one end is connected to the output end of the photovoltaic panel unit, and the other end is connected to the energy storage unit of the other photovoltaic power generation device.

The photovoltaic power generation system includes at least two photovoltaic power generation devices, wherein after the at least two photovoltaic power generation devices are connected through the input units and the output units thereof, the energy storage units thereof are connected in parallel, so that the at least two photovoltaic power generation devices form one power supply, that is to say, the at least two photovoltaic power generation devices form one power grid through the connection between the input units and the output units thereof, thus, the photovoltaic power generation system can output constant current and voltage, and the output voltage and current are stable, and in addition, after the two photovoltaic power generation devices are connected through the input unit and the output unit thereof, the photovoltaic panel unit of one photovoltaic power generation device may charge the energy storage unit of the other photovoltaic power generation device, thus, the photovoltaic power generation device that may generate light-sensitive electrical energy in the photovoltaic power generation system may charge the photovoltaic power generation device that cannot generate light-sensitive electrical energy, and the stored amounts of electricity of all the photovoltaic power generation devices can be increased simultaneously in the charging, and decreased simultaneously in the discharging, thus the utilization ratio of solar energy is maximized, and further it is ensured that the photovoltaic power generation system can stably supply power for electric devices for a long period of time.

In a possible implementation, the photovoltaic power generation device further includes: a detecting unit, which is connected to the photovoltaic panel unit, and is configured to detect an operation state of the photovoltaic panel unit, and output a level signal configured to represent the operation state; a control unit, which is connected to the detecting unit, and is configured to generate a corresponding control signal according to the level signal; and a boosting unit, which is connected to the control unit and the energy storage unit respectively, and is configured to boost the voltage output by the energy storage unit according to the control signal.

The detecting unit inputs the operation state of the photovoltaic panel unit to the control unit, so that the control unit controls the boosting unit to boost the voltage output by the energy storage unit according to this operation state, thereby ensuring that the photovoltaic power generation device can output a stable voltage.

In a possible implementation, the detecting unit includes: a first resistor, a second resistor, and a triode, one end of the first resistor is connected to the output end of the photovoltaic panel unit, the other end of the first resistor is connected to one end of the second resistor, the other end of the second resistor is grounded, the other end of the first resistor is also connected to a base of the triode, an emitter of the triode is grounded, and the collector of the triode is connected to the control unit.

In a possible implementation, one pin of the control unit is connected to the collector of the triode in the detecting unit, and is configured in such a manner that if the collector of the triode outputs a high level to the control unit, an enable pin of the control unit outputs a low level, so as to control the boosting unit to boost the voltage output by the energy storage unit, and stably supply power to the load; and the control unit is further configured in such a manner that after a preset period of time, the enable pin outputs a high level, and controls the boosting unit to stop boosting, so as to stop supplying power to the load.

In a possible implementation, one pin of the control unit is connected to the collector of the triode in the detecting unit, and is configured in such a manner that if the collector of the triode outputs a low level to the control unit, the_ enable pin of the control unit outputs a high level, and controls the boosting unit to stop boosting, so as to stop supplying power to the load.

In a possible implementation, the photovoltaic power generation device further includes: a manual switch, of which one end is connected to an output end of the energy storage unit, and the other end is connected to the boosting unit. When a user controls the manual switch to be closed, the boosting unit may boost the voltage output by the energy storage unit to ensure that the photovoltaic power generation device can stably supply power to the load externally connected, and when the user controls the manual switch to be opened, the connection between the boosting unit and the energy storage unit is disconnected, and the photovoltaic power generation device cannot supply power to the load externally connected.

In a possible implementation, the boosting unit includes: a boost control circuit, which is connected to the control unit and the energy storage unit, and is configured to be converted to a conducting state according to the control signal generated by the control unit; a boosting circuit, which is connected to the energy storage unit via the boost control circuit, and is configured in such a manner that a voltage input end thereof is connected to the energy storage unit when the boost control circuit is converted to the conducting state, so as to boost the voltage output by the energy storage unit.

After the boost control circuit receives the control signal generated by the control unit, the boost control circuit is converted to the conducting state, so that the boosting circuit is connected to the energy storage unit. As the control signal is generated by the control unit according to the operation state of the photovoltaic panel unit detected by the detecting unit, it can be ensured that the boosting circuit can perform the boosting operation on the energy storage unit only when the photovoltaic panel unit is operated.

In a possible implementation, the boost control circuit includes a P-channel semiconductor field effect transistor and a first capacitor, one end of the first capacitor is grounded, and the other end of the first capacitor is connected to a source of the P-channel semiconductor field effect transistor, a source of the P-channel semiconductor field effect transistor is further connected to the energy storage unit, a gate of the P-channel semiconductor field effect transistor is connected to the control unit, and a drain of the P-channel semiconductor field effect transistor is connected to a voltage input end of the boosting circuit.

In a possible implementation, the boosting circuit includes: a booster, of which a voltage input end is connected to the boost control circuit; a boost detection feedback circuit, which is connected to an output end and a feedback end of the booster respectively, and is configured to send a feedback signal to the booster according to the voltage output by the output end of the booster, so that the booster adjusts the voltage output by the output end of the booster according to the feedback signal, and thus the booster can output a stable boosted voltage.

In a possible implementation, the photovoltaic power generation device further includes: a boost detecting circuit, which is connected to the output end of the boosting unit and the control unit, and is configured to detect a boosted voltage value output by the boosting unit and transmit the boosted voltage value to the control unit; and an indicating module, which is connected to the control unit, and is configured to receive an indication signal sent by the control unit according to the boosted voltage value and make an indication according to the indication signal.

In a possible implementation, the indicating module includes a light emitting diode, a buzzer, and a horn.

In a possible implementation, the photovoltaic power generation device further includes: a charging and discharging protection circuit, which is connected to the energy storage unit, and is configured to prevent overcharging or overdischarging of the energy storage unit.

In a possible implementation, the input unit includes a shared input end, a grounded end, and a load input end, the output unit includes a shared output end, a load output end, and a grounded end; the shared input end is connected to the output end of the energy storage unit, the shared output end is connected to the output end of the photovoltaic panel unit, and the load output end is connected to the load input end of the input unit.

In a possible implementation, the photovoltaic power generation device includes a first photovoltaic power generation device and a second photovoltaic power generation device, a shared output end of the first photovoltaic power generation device is connected to a shared input end of the second photovoltaic power generation device, so that the photovoltaic panel unit of the first photovoltaic power generation device and the photovoltaic panel unit of the second photovoltaic power generation device are connected in parallel; and the load output end of the first photovoltaic power generation device is connected to the load input end of the second photovoltaic power generation device, the load input end of the second photovoltaic power generation device is connected to the load output end of the second photovoltaic power generation device, and the load output end of the second photovoltaic power generation device is externally connected to a load, so that the first photovoltaic power generation device and the second photovoltaic power generation device are connected in parallel to supply power to the load.

In a possible implementation, when there are a plurality of the photovoltaic power generation devices, the output unit of a first photovoltaic power generation device is connected to the input unit of a second photovoltaic power generation device, the output unit of the second photovoltaic power generation device is connected to the input unit of a third photovoltaic power generation device, the output unit of the third photovoltaic power generation device and an n-th photovoltaic power generation device are connected sequentially in the same manner, so that n photovoltaic power generation devices form a power grid therebetween, and supply power to the load, wherein n is an integer greater than or equal to 4.

In a possible implementation, the photovoltaic power generation device is configured to be connected to the load, the number of both the load and the photovoltaic power generation device is multiple, and the loads and the photovoltaic power generation devices are connected in parallel for multiple times, respectively, and then connected together.

In a possible implementation, the energy storage unit is a lithium battery or a nickel hydrogen battery.

Other features and advantages of the present disclosure will be illustrated in the following description, and will partially become obvious from the description, or understood by implementing the embodiments of the present disclosure. The objectives and other advantages of the present disclosure may be achieved and obtained through the structures specifically indicated in the description and the accompanying drawings.

BRIEF DESCRIPTION OF DRAWINGS

In order to more clearly illustrate technical solutions of embodiments of the present disclosure, accompanying drawings which need to be used in the embodiments of the present disclosure will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

Reference signs: 10—photovoltaic power generation system; 100—photovoltaic power generation device; 110—photovoltaic panel unit; 120—energy storage unit; 121—charging and discharging protection circuit; 130—input unit; 140—output unit; 150—detecting unit; 160—control unit; 170—boosting unit; 171—boost control circuit; 172—boosting circuit; 1721—boost detection feedback circuit; 180—boost detecting circuit; 190—indicating module.

DETAILED DESCRIPTION OF EMBODIMENTS

The technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope of the present disclosure claimed, but merely illustrates chosen embodiments of the present disclosure. All of other embodiments obtained by a person skilled in the art based on the embodiments of the present disclosure without using any creative efforts shall fall within the scope of protection of the present disclosure.

In the description of the present disclosure, it should be indicated that terms such as "first", "second", and "third" are merely for distinctive description, but should not be construed as indicating or implying importance in the relativity.

Other features and advantages of the present disclosure will be illustrated in the following description, and will partially become obvious from the description, or understood by implementing the embodiments of the present disclosure. The objectives and other advantages of the present disclosure may be achieved and obtained through the structures specifically indicated in the description and the accompanying drawings.

Some embodiments of the present disclosure are described in detail below in combination with the accompanying drawings. The features in the following embodiments may be combined with each other if there is no conflict.

Figure 1:
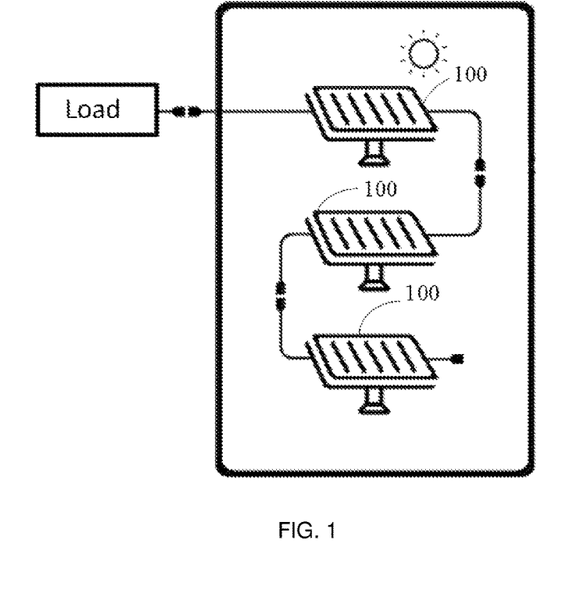
FIG. 1 is a structural block diagram of a photovoltaic power generation system provided in an embodiment of the present disclosure.
Figure 2:
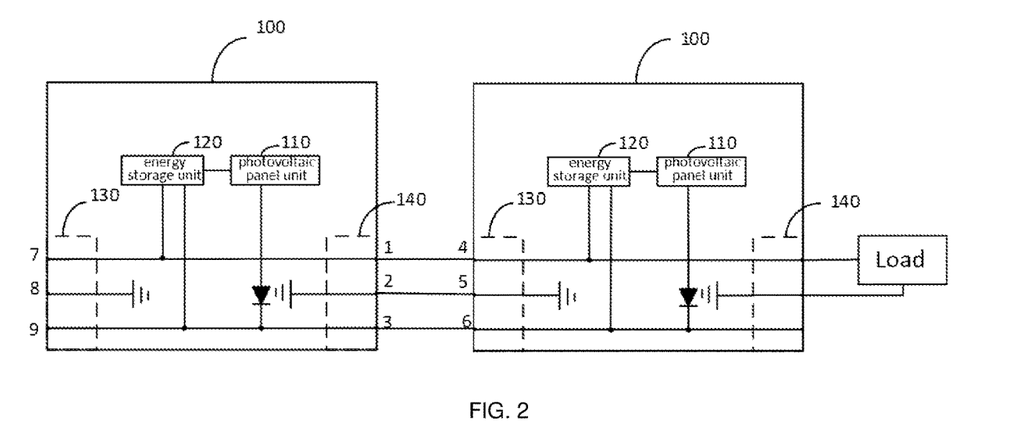
FIG. 2 is a structural block diagram of another photovoltaic power generation system provided in an embodiment of the present disclosure.

Referring to FIG. 1, FIG. 1 is a structural block diagram of a photovoltaic power generation system 10 provided in an embodiment of the present disclosure, including at least two photovoltaic power generation devices 100; referring to FIG. 2, FIG. 2 is a structural block diagram of another photovoltaic power generation system 10 provided in an embodiment of the present disclosure. Taking the photovoltaic power generation device 100 on the left in FIG. 2 as an example, each photovoltaic power generation device 100 therein includes: a photovoltaic panel unit 110, which is configured to generate light-sensitive electrical energy based on photovoltaic effect; an energy storage unit 120, which is connected to an output end of the photovoltaic panel unit 110, and is configured to store the light-sensitive electrical energy; an input unit 130, of which one end is connected to the energy storage unit 120, and the other end is connected to the output end of the photovoltaic panel unit 110 of the other photovoltaic power generation device 100; and an output unit 140, of which one end is connected to the output end of the photovoltaic panel unit 110, and the other end is connected to the energy storage unit 120 of the other photovoltaic power generation device 100.

In a possible implementation, a shared input end 9 of the input unit 130 is connected to an output end of the energy storage unit 120; a shared output end 3 of the output unit 140 is connected to the output end of the photovoltaic panel unit 110, a load output end 1 of the output unit is connected to a load input end 7 of the input unit, and a port with reference sign 8 of the input unit 130 and a port with reference sign 2 of the output unit 140 are both grounded ends.

With continued reference to FIG. 2, the at least two photovoltaic power generation devices 100 at least include a first photovoltaic power generation device 100 and a second photovoltaic power generation device 100, wherein the first photovoltaic power generation device 100 may be understood as the photovoltaic power generation device 100 on the left in FIG. 2, the second photovoltaic power generation device 100 may be understood as the photovoltaic power generation device 100 on the right in FIG. 2, the shared output end 3 of the output unit 140 of the first photovoltaic power generation device 100 is connected to the shared input end 6 of the input unit 130 of the second photovoltaic power generation device 100, so that the photovoltaic panel unit 110 of the first photovoltaic power generation device 100 and the photovoltaic panel unit 110 of the second photovoltaic power generation device 100 are connected in parallel; the load output end 1 of the output unit 140 of the first photovoltaic power generation device 100 is connected to the load input end 4 of the input unit 130 of the second photovoltaic power generation device 100, the load input end 4 of the input unit 130 of the second photovoltaic power generation device 100 is connected to the load output end 1 of the output unit 140 of the second photovoltaic power generation device 100, and the load output end of the output unit 140 of the second photovoltaic power generation device 100 is externally connected to a load, so that the first photovoltaic power generation device 100 and the second photovoltaic power generation device 100 are connected in parallel to supply power to the load.

For example, in FIG. 2, the output unit 140 of the first photovoltaic power generation device 100 (the photovoltaic power generation device on the left in FIG. 2) is connected to the input unit 130 of the second photovoltaic power generation device 100 (the photovoltaic power generation device on the right in FIG. 2). It is assumed that the photovoltaic panel unit 110 of the first photovoltaic power generation device 100 can generate power normally, and the photovoltaic panel unit 110 of the second photovoltaic power generation device 100 is not in contact with sunlight and cannot generate power, at this time, the photovoltaic panel unit 110 of the first photovoltaic power generation device 100 generates electrical energy and may transmit the electrical energy generated to the energy storage unit 120 of the first photovoltaic power generation device to further charge the energy storage unit 120 of the first photovoltaic power generation device, and meanwhile, the electrical energy generated by the photovoltaic panel unit 110 of the first photovoltaic power generation device 100 may also be transmitted to the energy storage unit 120 of the second photovoltaic power generation device 100 to further charge the energy storage unit of the second photovoltaic power generation device 100, thus in this way, it may be realized that the second photovoltaic power generation device still can store a certain amount of electrical energy in a situation that the second photovoltaic power generation device cannot generate power and further supply power to the load powered by the second photovoltaic power generation device. Through the above manner, power balance is also realized between the first photovoltaic power generation device and the second photovoltaic power generation device.

Figure 3:
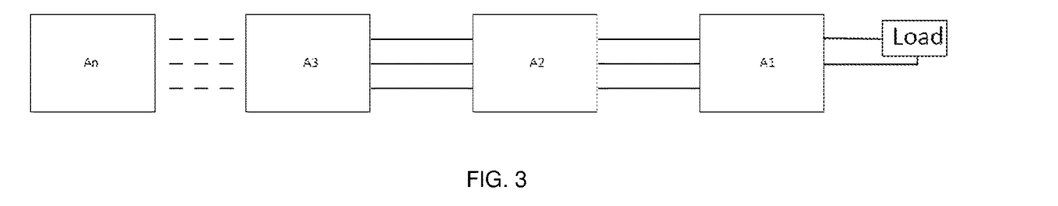
FIG. 3 is a structural block diagram of a further photovoltaic power generation system provided in an embodiment of the present disclosure.

It may be understood that if the photovoltaic power generation system 10 includes three photovoltaic power generation devices 100, it only needs to connect the output unit 140 of the first photovoltaic power generation device 100 to the input unit 130 of the second photovoltaic power generation device 100, connect the output unit 140 of the second photovoltaic power generation device 100 to the input unit 130 of the third photovoltaic power generation device 100, and connect the output unit 140 of the third photovoltaic power generation device 100 to the load. Referring to FIG. 3, FIG. 3 is a connection diagram of the photovoltaic power generation system 10 including n photovoltaic power generation devices 100, wherein the input unit 130 of a photovoltaic power generation device A1 is connected to the output unit 140 of a photovoltaic power generation device A2, the input unit 130 of the photovoltaic power generation device A2 is connected to the output unit 140 of a photovoltaic power generation device A3, the photovoltaic power generation device A3 and the photovoltaic power generation device An are connected in the same manner, thus finally the n photovoltaic power generation devices can form one power grid, and jointly supply power to the load, therefore, when there is a photovoltaic power generation device that cannot generate power if there is no light irradiation in the n photovoltaic power generation devices, the other photovoltaic power generation devices normally generating power in the n photovoltaic power generation devices can supply electrical energy to the load, so as to ensure stable operation of the load, and when all of the n photovoltaic power generation devices can charge, the amount of electricity stored in each photovoltaic power generation device increases simultaneously in the charging, and decreases simultaneously in the discharging, wherein n is an integer greater than or equal to 4.

In the photovoltaic power generation system of the above design, the photovoltaic power generation system 10 includes at least two photovoltaic power generation devices 100, wherein after the at least two photovoltaic power generation devices 100 are connected through the input units and the output units thereof, the energy storage units thereof are connected in parallel, so that at least two photovoltaic power generation devices 100 form one power supply, that is to say, the at least two photovoltaic power generation devices 100 form one power grid through the connection between the input units and the output units thereof, thus, the photovoltaic power generation system can output constant current and voltage, and the output voltage and current are stable, and in addition, after the two photovoltaic power generation devices are connected through the output unit and the input unit thereof, the photovoltaic panel unit of one photovoltaic power generation device may charge the energy storage unit of the other photovoltaic power generation device, thus, the photovoltaic power generation device that may generate light-sensitive electrical energy in the photovoltaic power generation system may charge the photovoltaic power generation device that cannot generate light-sensitive electrical energy, and the stored amounts of electricity of all the photovoltaic power generation devices can be increased simultaneously in the charging, and decreased simultaneously in the discharging, thus the utilization ratio of solar energy is maximized, and further, the operation time and stability of the photovoltaic power generation system are improved.

Figure 4:
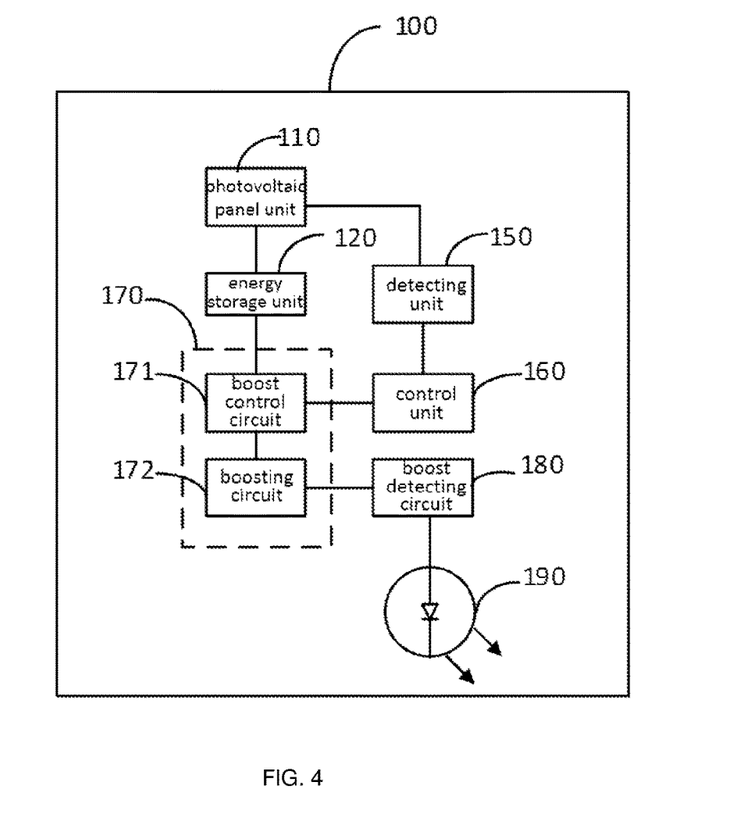
FIG. 4 is a structural block diagram of a photovoltaic power generation device provided in an embodiment of the present disclosure.

Referring to FIG. 4, the photovoltaic power generation device 100 further includes: a detecting unit 150, which is connected to the photovoltaic panel unit 110, and is configured to detect an operation state of the photovoltaic panel unit 110, and output a level signal configured to represent the operation state; a control unit 160, which is connected to the detecting unit 150, and is configured to generate a corresponding control signal according to the level signal; and a boosting unit 170, which is connected to the control unit 160 and the energy storage unit 120 respectively, and is configured to boost the voltage output by the energy storage unit 120 according to the control signal. In the above implementation process, the detecting unit 150 inputs the operation state of the photovoltaic panel unit 110 to the control unit 160, so that the control unit 160 controls the boosting unit 170 to boost the voltage output by the energy storage unit 120 according to this operation state, thereby ensuring that the photovoltaic power generation device 100 can output a stable voltage.

In the above, the boosting unit 170 includes: a boost control circuit 171, which is connected to the control unit 160 and the energy storage unit 120, and is configured to be converted to a conducting state according to the control signal generated by the control unit 160; a boosting circuit 172, which is connected to the energy storage unit 120 via the boost control circuit 171, and is configured to connect a voltage input end thereof to the energy storage unit 120 when the boost control circuit 171 is converted to the conducting state, so as to boost the voltage output by the energy storage unit 120.

In the above implementation process, after the boost control circuit 171 receives the control signal generated by the control unit 160, the boost control circuit 171 is converted to the conducting state, so that the boosting circuit 172 is connected to the energy storage unit 120. As the control signal is generated by the control unit 160 according to the operation state of the photovoltaic panel unit 110 detected by the detecting unit 150, it can be ensured that the boosting circuit 172 can perform the boosting operation on the energy storage unit 120 only when the photovoltaic panel unit 110 is not operated, and does not perform the boosting operation on the energy storage unit 120 when the photovoltaic panel unit 110 is operated.

In addition, the photovoltaic power generation device 100 further includes: a boost detecting circuit 180, which is connected to the output end of the boosting unit 170 and the control unit 160, and is configured to detect a boosted voltage value output by the boosting unit 170 and transmit the boosted voltage value to the control unit 160; an indicating module 190, which is connected to the control unit 160, and is configured to receive an indication signal sent by the control unit 160 according to the boosted voltage value and make an indication according to the indication signal, wherein the indicating module may be a light emitting diode, and it may be understood that if the photovoltaic power generation system 10 can make voice indications, the indicating module may use elements such as buzzer and horn.

Figure 5:
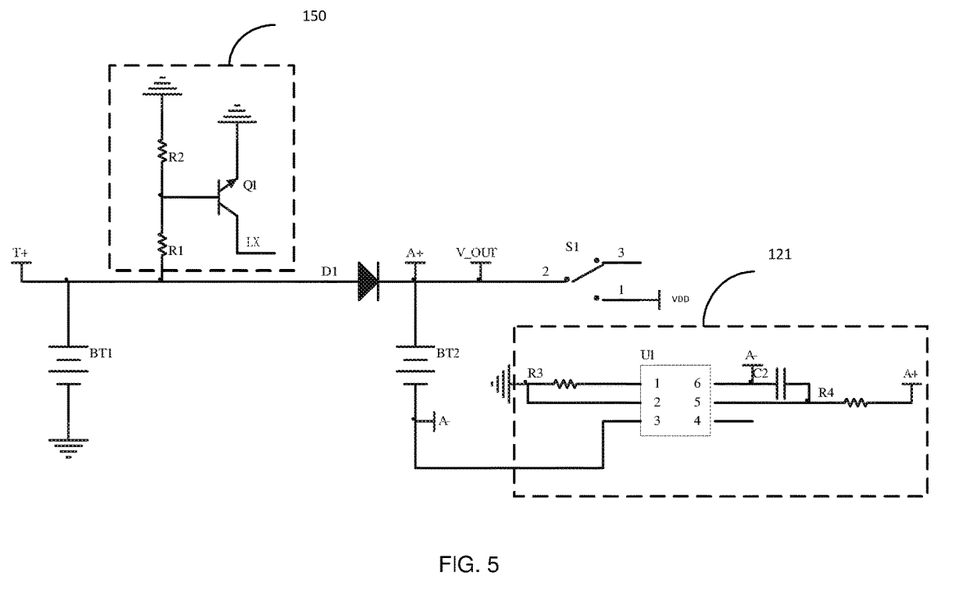
FIG. 5 is a circuit diagram of a photovoltaic power generation device provided in an embodiment of the present disclosure.

Referring to FIG. 5, the photovoltaic panel unit 110 is a photovoltaic panel BT1, which is configured to generate light-sensitive electrical energy based on photovoltaic effect; the energy storage unit 120 is a lithium battery BT2, which is connected to the photovoltaic panel BT1, and is configured to store the light-sensitive electrical energy, wherein the photovoltaic panel BT1 and the lithium battery BT2 are connected via a diode D1, and the energy storage unit 120 may also be other types of energy storage batteries. In addition, the photovoltaic power generation device 100 further includes a charging and discharging protection circuit 121, which is connected to the energy storage unit 120, and is configured to prevent overcharging or overdischarging of the energy storage unit 120. For example, when the voltage of the lithium battery BT2 is higher than 4.3 V or lower than 2.5 V, the energy storage unit 120 is controlled to disconnect the power supply, so as to prevent overcharging or overdischarging of the energy storage unit 120; in addition, it should be noted that the energy storage unit 120 further may be a nickel hydrogen battery in addition to the lithium battery BT2.

Optionally, the detecting unit 150 includes: a first resistor R1, a second resistor R2, and a triode Q1, wherein one end of the first resistor R1 is connected to the output end of the photovoltaic panel unit 110, the other end of the first resistor R1 is connected to one end of the second resistor R2, the other end of the second resistor R2 is grounded, the other end of the first resistor R1 is also connected to a base of the triode Q1, an emitter of the triode Q1 is grounded, and the collector LX of the triode Q1 is connected to the control unit 160. When there is sunlight, the output end of the photovoltaic panel BT1 generates a voltage, the triode Q1 is enabled to be conducted through the first resistor R1 and the second resistor R2, and the collector LX of the triode Q1 outputs a low level to the control unit 160.

Optionally, the photovoltaic power generation device 100 further includes a manual switch S1, of which one end is connected to the output end of the energy storage unit 120, and the other end is connected to the boosting unit 170. As shown in FIG. 5, a pin No. 2 of the manual switch S1 is connected to the energy storage unit 120, a pin No. 3 is suspended, and a pin No. 1 is connected to the boosting unit 170. When the manual switch S1 is closed, i.e. the pin No. 1 is in conduction with the pin No. 2, the boosting unit 170 may boost the voltage output by the energy storage unit 120, and when the manual switch S1 is opened, that is, the pin No. 2 is in conduction with the pin No. 3, the connection between the boosting unit 170 and the energy storage unit 120 is disconnected, then the photovoltaic power generation device 100 cannot supply power to the load externally connected.

In the above implementation process, when a user controls the manual switch S1 to be closed, the boosting unit 170 may boost the voltage output by the photovoltaic panel unit 110 to ensure that the photovoltaic power generation device 100 can stably supply power to the load externally connected, and when the user controls the manual switch S1 to be opened, the connection between the boosting unit 170 and the photovoltaic panel unit 110 is disconnected, and the photovoltaic power generation device 100 cannot supply power to the load externally connected.

Figure 6:
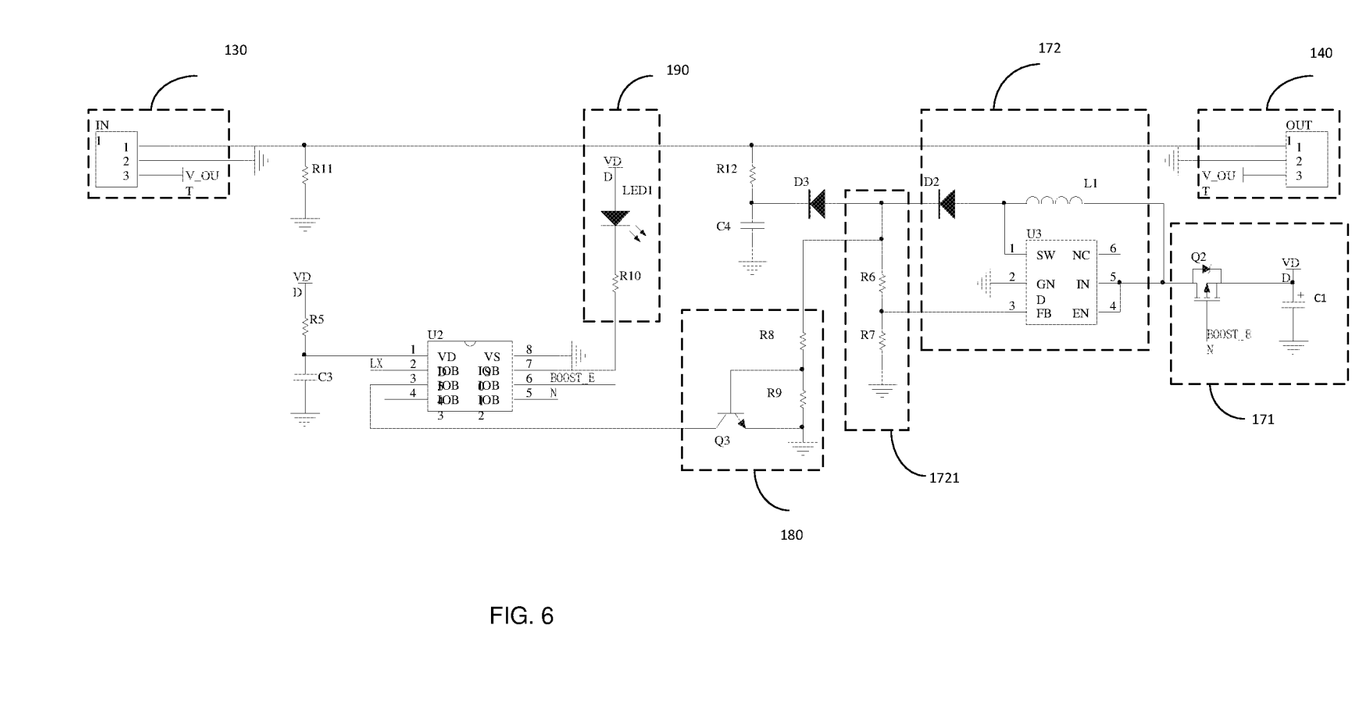
FIG. 6 is a circuit diagram of another photovoltaic power generation device provided in an embodiment of the present disclosure.

Referring to FIG. 6, an element OUT1 is the output unit 140, an element IN1 is the input unit 130, U2 in FIG. 6 is the control unit 160, a VDD end of the control unit U2 is externally connected to an operating voltage, an IOB5 pin of the control unit U2 is connected to the collector LX of the triode in the detecting unit 150, if the collector LX of the triode outputs a high level to the control unit U2, the control unit U2 controls BOOST_EN to output a low level, so as to control the boosting unit 170 to boost the voltage output by the energy storage unit 120, then the pin No. 1 and the pin No. 2 of the output unit OUT1 are externally connected to the load, and stably supply power to the load. As the electrical energy in the energy storage unit 120 has a maximum value, a preset period of time may be set, and after the photovoltaic power generation device 100 has supplied power to the load for the preset period of time, the remaining electrical energy in the energy storage unit 120 is insufficient to supply power to the load, the control unit U2 controls the BOOST_EN end to output a high level, to control the boosting unit 170 to stop boosting, so as to stop supplying power to the load. If the collector LX of the triode outputs a low level to the control unit U2, then the photovoltaic panel unit 110 is performing a charging operation on the energy storage unit 120, the control unit U2 controls the BOOST_EN end to output a high level, to control the boosting unit 170 to stop boosting, that is to say, at this time, the photovoltaic power generation device 100 stops supplying power to the load.

The boosting unit 170 includes: a boost control circuit 171 and a boosting circuit 172. Referring to FIG. 6, the boost control circuit 171 includes a P-channel semiconductor field effect transistor Q2 and a first capacitor C1, wherein one end of the first capacitor is grounded, and the other end of the first capacitor is connected to a source of the P-channel semiconductor field effect transistor Q2, a source of the P-channel semiconductor field effect transistor Q2 is further connected to the energy storage unit 120, a gate of the P-channel semiconductor field effect transistor Q2 is connected to the control unit U2, and a drain of the P-channel semiconductor field effect transistor Q2 is connected to a voltage input end of the boosting circuit 172. If the manual switch S1 is closed, the source of the P-channel semiconductor field effect transistor Q2 is connected to the energy storage unit 120, and when the control unit U2 controls the BOOST_EN end to output a low level, the P-channel semiconductor field effect transistor Q2 is conducted. The boosting circuit 172 is connected to the energy storage unit 120 via the boost control circuit, so as to be configured in such a manner that the voltage input end of the boosting circuit is connected to the energy storage unit 120 when the boost control circuit 171 is converted to a conducting state, so as to boost the voltage output by the energy storage unit 120. That is to say, when the control unit U2 controls the BOOST_EN end to output the low level, the energy storage unit 120 is directly connected to the input end of the boosting circuit 172.

As shown in FIG. 6, the boosting circuit 172 includes a booster U3. Referring to FIG. 6, the boosting circuit 172 includes: the booster U3, of which a voltage input end is connected to the boost control circuit 171; a boost detection feedback circuit 1721, which is connected to an output end and a feedback end of the booster U3 respectively, and is configured to send a feedback signal to the booster U3 according to the voltage output by the output end of the booster U3, so that the booster U3 adjusts the voltage output by the output end of the booster U3 according to the feedback signal, thereby enabling the booster U3 to output a stable boosted voltage.

In the embodiment of the above design, the photovoltaic power generation system 10 designed in the present disclosure may boost the output voltage thereof to about 30 V through the boost control circuit 171 and the boosting circuit 172, so that the transmission efficiency of electrical energy is improved while within the range of safety voltage, thus the photovoltaic power generation system 10 designed in the present disclosure is larger than the existing micro-energy panels, can drive more loads, and meanwhile may also be adapted to medium and long distance (50 m to 100 m) transport.

In addition, the photovoltaic power generation device 100 further includes: a boost detecting circuit 180, which is connected to the output end of the boosting unit 170 and the control unit U2, and is configured to detect a boosted voltage value output by the boosting unit 170 and transmit the boosted voltage value to the control unit U2; and an indicating module 190, which is connected to the control unit U2, and is configured to receive an indication signal sent by the control unit U2 according to the boosted voltage value and make an indication according to the indication signal. In a possible implementation, the boost detecting circuit 180 detects a low level signal output by a triode Q3 to an IOB4 pin of the control unit U2, it indicates that the boosting unit 170 is performing a stable boosting output, then the control unit U2 sends an indication signal to the indicating module 190 through the IOB0 pin, so that a light emitting diode LED1 in the indicating module 190 performs light emission instruction. The boost detecting circuit 180 detects a high level signal output by the triode Q3 to the IOB4 pin of the control unit U2, it indicates that the boosting unit 170 does not perform a stable boosting output, then the control unit U2 sends an indication signal to the indicating module 190 through the IOB0 pin, so that the light emitting diode LED1 in the indicating module 190 stops emitting light. The indicating module 190 shown herein in FIG. 6 is a light emitting diode, and it may be understood that if the photovoltaic power generation system 10 can make the voice indication, the indicating module 190 may use elements such as buzzer and horn.

Figure 7:
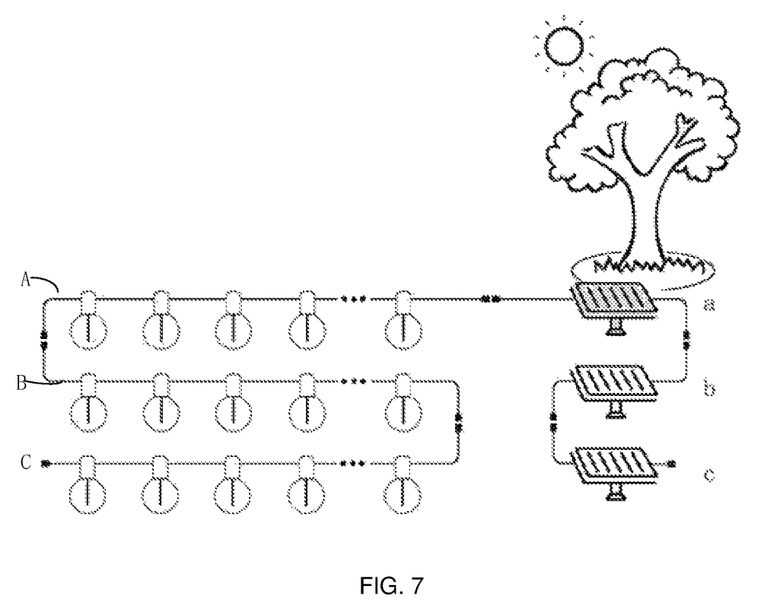
FIG. 7 is a schematic view of the photovoltaic power generation system provided in an embodiment of the present disclosure.

In addition to the aforementioned embodiments, the photovoltaic power generation system designed in the present disclosure further may be used in cooperation with a plurality of loads that can be connected in parallel, and the loads and the photovoltaic power generation devices 100 are connected in parallel for multiple times, respectively, and then connected together, thereby realizing a stable and reliable use effect. In a possible implementation, as shown in FIG. 7, the three photovoltaic power generation devices 100 may be respectively represented as a, b, and c, which simultaneously supply power to the three loads A, B, and C connected in series. As the shared power supply, i.e. the photovoltaic power generation devices connected to each other, may charge each other, even if the charging efficiencies of the three photovoltaic power generation devices are different or placement positions are different, the electrical energy of the three photovoltaic power generation devices 100 still can substantially be kept balanced; when discharging to the loads, the amounts of electricity of batteries of the three photovoltaic power generation devices 100 a, b, and c, by means of real-time balance, are sufficient, and the duration may meet the requirement and the efficiency of solar energy is not wasted.

To sum up, an embodiment of the present disclosure provides a photovoltaic power generation system 10, including at least two photovoltaic power generation devices 100; each photovoltaic power generation device 100 includes: a photovoltaic panel unit 110, which is configured to generate light-sensitive electrical energy based on photovoltaic effect; an energy storage unit 120, which is connected to an output end of the photovoltaic panel unit 110, and is configured to store the light-sensitive electrical energy; an input unit 130, of which one end is connected to the energy storage unit 120, and the other end is connected to the output end of the photovoltaic panel unit 110 of the other photovoltaic power generation device 100; and an output unit 140, of which one end is connected to the output end of the photovoltaic panel unit 110, and the other end is connected to the energy storage unit 120 of the other photovoltaic power generation device 100. The photovoltaic power generation system 10 includes at least two photovoltaic power generation devices 100, wherein after the at least two photovoltaic power generation devices 100 are connected through the input units 130 and the output units 140 thereof, the energy storage units 120 thereof are connected in parallel, so that the at least two photovoltaic power generation devices 100 form one power supply, that is to say, the at least two photovoltaic power generation devices 100 form one power grid through the connection between the input units 130 and the output units 140 thereof, thus, the photovoltaic power generation system 10 can output constant current and voltage, and the output voltage and current are stable, and in addition, after the two photovoltaic power generation devices are connected through the input unit and the output unit thereof, the photovoltaic panel unit of one photovoltaic power generation device may charge the energy storage unit of the other photovoltaic power generation device, thus, the photovoltaic power generation device that may generate light-sensitive electrical energy in the photovoltaic power generation system may charge the photovoltaic power generation device that cannot generate light-sensitive electrical energy, thus the utilization rate of solar energy is maximized, and further it is ensured that the photovoltaic power generation system 10 can stably supply power for electric devices for a long period of time; it may be seen from the foregoing description that compared with the conventional small solar panels, the photovoltaic power generation system 10 designed in the present disclosure has the advantages such as large power, high power supply efficiency, and capability of setting the number of solar panels flexibly according to the condition of the load, so that the photovoltaic power generation system 10 may be used alone or a plurality of photovoltaic power generation systems may be used in combination to form a micro power grid. Compared with conventional large-power solar energy, the present disclosure has a low cost, strong practicality, and a low maintenance cost, and the solar panel, taken as a unit, may be flexibly added, so that the micro power grid is formed to supply power to low-voltage household appliances.

The above-mentioned are merely for embodiments of the present disclosure and not used to limit the scope of protection of the present disclosure, and for one skilled in the art, various modifications and changes may be made to the present disclosure. Any modifications, equivalent substitutions, improvements and so on, within the spirit and principle of the present disclosure, should be covered within the scope of protection of the present disclosure.

INDUSTRIAL APPLICABILITY

The embodiments of the present disclosure provide a photovoltaic power generation system, including at least two photovoltaic power generation devices; each photovoltaic power generation device includes: a photovoltaic panel unit, which is configured to generate light-sensitive electrical energy based on photovoltaic effect; an energy storage unit, which is connected to an output end of the photovoltaic panel unit, and is configured to store the light-sensitive electrical energy; an input unit, of which one end is connected to the energy storage unit, and the other end is connected to the output end of the photovoltaic panel unit of the other photovoltaic power generation device; and an output unit, of which one end is connected to the output end of the photovoltaic panel unit, and the other end is connected to the energy storage unit of the other photovoltaic power generation device. The photovoltaic power generation system includes at least two photovoltaic power generation devices, wherein after the at least two photovoltaic power generation devices are connected through the input units and the output units thereof, the energy storage units thereof are connected in parallel, so that at least two photovoltaic power generation devices form one power supply, that is to say, at least two photovoltaic power generation devices form one power grid through the connection between the input units and the output units thereof, thus, the photovoltaic power generation system can output constant current and voltage, and the output voltage and current are stable, and in addition, after the two photovoltaic power generation devices are connected through the input unit and the output unit thereof, the photovoltaic panel unit of one photovoltaic power generation device may charge the energy storage unit of the other photovoltaic power generation device, thus, the photovoltaic power generation device that may generate light-sensitive electrical energy in the photovoltaic power generation system may charge the photovoltaic power generation device that cannot generate light-sensitive electrical energy, thus the utilization ratio of solar energy is maximized, and further, it is ensured that the photovoltaic power generation system can stably supply power for electric devices for a long period of time; it may be seen from the foregoing description that compared with the conventional small solar panels, the photovoltaic power generation system designed in the present disclosure has the advantages such as large power, high power supply efficiency, and capability of setting the number of solar panels flexibly according to the condition of the load, so that the photovoltaic power generation system may be used alone or a plurality of photovoltaic power generation systems may be used in combination to form a micro power grid. Compared with conventional large-power solar energy, the present disclosure has a low cost, strong practicality, and a low maintenance cost, and the solar panel, taken as a unit, may be flexibly added, so that the micro power grid is formed to supply power to low-voltage household appliances.

What is claimed is:

1. A photovoltaic power generation system, comprising at least two photovoltaic power generation devices,
wherein each of the at least two photovoltaic power generation devices comprises:
a photovoltaic panel unit, which is configured to generate light-sensitive electrical energy based on photovoltaic effect;
an energy storage unit connected to an output end of the photovoltaic panel unit and configured to store the light-sensitive electrical energy;
an input unit; and
an output unit;
wherein the input unit of a first of the at least two photovoltaic power generation devices has a first end connected to the energy storage unit of the first of the at least two photovoltaic power generation devices and a second end connected to an output end of the photovoltaic panel unit of a second of the at least two photovoltaic power generation devices, and
wherein the output unit of the first of the at least two photovoltaic power generation devices has a first end connected the output end of the photovoltaic panel unit of the first of the at least two photovoltaic power generation devices and a second end connected to the energy storage unit of the second of the at least two photovoltaic power generation devices.

2. The photovoltaic power generation system according to claim 1, wherein each of the at least two photovoltaic power generation devices further comprises:
a detecting unit, which is connected to the photovoltaic panel unit, and is configured to detect an operation state of the photovoltaic panel unit, and output a level signal configured to represent the operation state;
a control unit, which is connected to the detecting unit, and is configured to generate a corresponding control signal according to the level signal; and
a boosting unit, which is connected to the control unit and the energy storage unit, respectively, and is configured to boost a voltage output by the energy storage unit according to the control signal.

3. The photovoltaic power generation system according to claim 2, wherein the detecting unit comprises: a first resistor, a second resistor, and a triode, one end of the first resistor is connected to the output end of the photovoltaic panel unit, the other end of the first resistor is connected to one end of the second resistor, the other end of the second resistor is grounded, the other end of the first resistor is also connected to a base of the triode, an emitter of the triode is grounded, and a collector of the triode is connected to the control unit.

4. The photovoltaic power generation system according to claim 3, wherein one pin of the control unit is connected to the collector of the triode in the detecting unit, and is configured in such a manner that if the collector of the triode outputs a high level to the control unit, an enable pin of the control unit outputs a low level, so as to control the boosting unit to boost the voltage output by the energy storage unit, and stably supply power to a load; and
the control unit is further configured in such a manner that after a preset period of time, the enable pin outputs a high level, and controls the boosting unit to stop boosting, so as to stop supply power to the load.

5. The photovoltaic power generation system according to claim 3, wherein one pin of the control unit is connected to the collector of the triode in the detecting unit, and is configured in such a manner that if the collector of the triode outputs a low level to the control unit, an enable pin of the control unit outputs a high level, and controls the boosting unit to stop boosting, so as to stop supplying power to a load.

6. The photovoltaic power generation system according to claim 2, wherein each of the at least two photovoltaic power generation devices further comprises:
a manual switch, of which one end is connected to an output end of the energy storage unit, and the other end is connected to the boosting unit.

7. The photovoltaic power generation system according to claim 2, wherein the boosting unit comprises:
a boost control circuit, which is connected to the control unit and the energy storage unit, and is configured to be converted to a conducting state according to the control signal generated by the control unit; and
a boosting circuit, which is connected to the energy storage unit via the boost control circuit, and is configured in such a manner that a voltage input end of the boosting circuit is connected to the energy storage unit when the boost control circuit is converted to the conducting state, so as to boost the voltage output by the energy storage unit.

8. The photovoltaic power generation system according to claim 7, wherein the boost control circuit comprises a P-channel semiconductor field effect transistor and a first capacitor, one end of the first capacitor is grounded, and the other end of the first capacitor is connected to a source of the P-channel semiconductor field effect transistor, the source of the P-channel semiconductor field effect transistor is further connected to the energy storage unit, a gate of the P-channel semiconductor field effect transistor is connected to the control unit, and a drain of the P-channel semiconductor field effect transistor is connected to the voltage input end of the boosting circuit.

9. The photovoltaic power generation system according to claim 7, wherein the boosting circuit comprises:
a booster, of which a voltage input end is connected to the boost control circuit; and
a boost detection feedback circuit, which is connected to an output end and a feedback end of the booster, respectively, and is configured to send a feedback signal to the booster according to a voltage output by an output end of the booster, so that the booster adjusts the voltage output by the output end of the booster according to the feedback signal.

10. The photovoltaic power generation system according to claim 2, wherein each of the at least two photovoltaic power generation devices further comprises:
a boost detecting circuit, which is connected to an output end of the boosting unit and the control unit, and is configured to detect a boosted voltage value output by the boosting unit and transmit the boosted voltage value to the control unit; and
an indicating module, which is connected to the control unit, and is configured to receive an indication signal sent by the control unit according to the boosted voltage value and make an indication according to the indication signal.

11. The photovoltaic power generation system according to claim 10, wherein the indicating module comprises a light emitting diode, a buzzer, and a horn.

12. The photovoltaic power generation system according to claim 1, wherein each of the at least two photovoltaic power generation devices further comprises:
a charging and discharging protection circuit, which is connected to the energy storage unit, and is configured to prevent overcharging or overdischarging of the energy storage unit.

13. The photovoltaic power generation system according to claim 1, wherein the input unit comprises a shared input end, a grounded end, and a load input end, the output unit comprises a shared output end, a load output end, and a grounded end, wherein the shared input end is connected to an output end of the energy storage unit, the shared output end is connected to the output end of the photovoltaic panel unit, and the load output end is connected to the load input end of the input unit.

14. The photovoltaic power generation system according to claim 1, wherein each of the at least two photovoltaic power generation devices comprises a first photovoltaic power generation device and a second photovoltaic power generation device, wherein a shared output end of the first photovoltaic power generation device is connected to a shared input end of the second photovoltaic power generation device, so that a photovoltaic panel unit of the first photovoltaic power generation device and a photovoltaic panel unit of the second photovoltaic power generation device are connected in parallel; and
a load output end of the first photovoltaic power generation device is connected to a load input end of the second photovoltaic power generation device, the load input end of the second photovoltaic power generation device is connected to a load output end of the second photovoltaic power generation device, and the load output end of the second photovoltaic power generation device is externally connected to a load, so that the first photovoltaic power generation device and the second photovoltaic power generation device are connected in parallel to supply power to the load.

15. The photovoltaic power generation system according to claim 1, wherein when a plurality of photovoltaic power generation devices are provided, an output unit of a first photovoltaic power generation device is connected to an input unit of a second photovoltaic power generation device, an output unit of the second photovoltaic power generation device is connected to an input unit of a third photovoltaic power generation device, an output unit of the third photovoltaic power generation device and an n-th photovoltaic power generation device are connected sequentially in a same manner, so that n photovoltaic power generation devices form a power grid therebetween, and supply power to a load, wherein n is an integer greater than or equal to 4.

16. The photovoltaic power generation system according to claim 1, wherein the at least two photovoltaic power generation devices are configured to be connected to multiple loads, the multiple loads and the at least two photovoltaic power generation devices are connected in parallel for multiple times, respectively, and then connected together.

17. The photovoltaic power generation system according to claim 1, wherein the energy storage unit is a lithium battery or a nickel hydrogen battery.

18. The photovoltaic power generation system according to claim 3, wherein each of the at least two photovoltaic power generation devices further comprises:
a manual switch, of which one end is connected to the output end of the energy storage unit, and the other end is connected to the boosting unit.

19. The photovoltaic power generation system according to claim 3, wherein the boosting unit comprises:
a boost control circuit, which is connected to the control unit and the energy storage unit, and is configured to be converted to a conducting state according to the control signal generated by the control unit; and a boosting circuit, which is connected to the energy storage unit via the boost control circuit, and is configured in such a manner that a voltage input end of the boosting circuit is connected to the energy storage unit when the boost control circuit is converted to the conducting state, so as to boost the voltage output by the energy storage unit.

20. The photovoltaic power generation system according to claim 8, wherein the boosting circuit comprises:
   a booster, of which a voltage input end is connected to the boost control circuit; and
   a boost detection feedback circuit, which is connected to an output end and a feedback end of the booster, respectively, and is configured to send a feedback signal to the booster according to a voltage output by an output end of the booster, so that the booster adjusts the voltage output by the output end of the booster according to the feedback signal.

* * * * *